Patented June 16, 1953

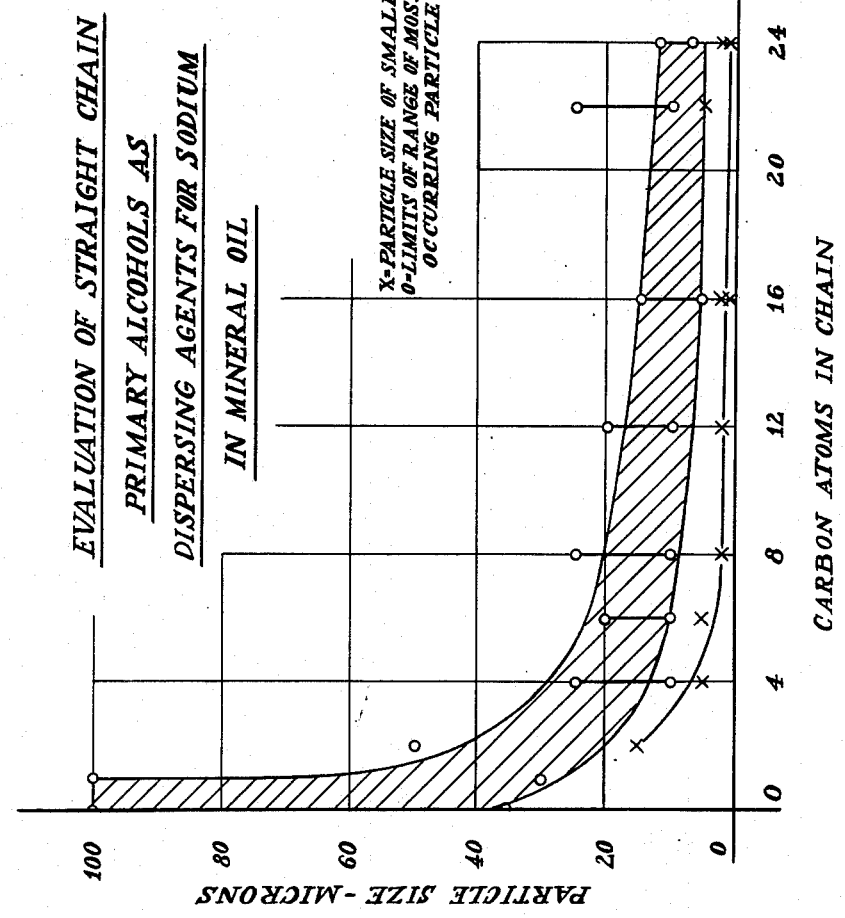

2,642,344

UNITED STATES PATENT OFFICE 2,642,344

ALKALI METAL DISPERSIONS

Herbert K. Livingston, Wilmington, Del., assignor to E. I. du Pont de Nemours and Company, Wilmington, Del., a corporation of Delaware Application July 15, 1950, Serial No. 173,985

14 Claims. (Cl. 44—51)

This invention relates to alkali metal dispersions in inert liquids and to their preparation.

Coarse sodium dispersions, commonly referred to as "sodium sands," and their use are well known. They are made by shaking or agitating molten sodium in a suitable inert liquid so as to effect subdivision of the metal in the liquid, then allowing the system to cool to a temperature below the freezing point of sodium. The sodium particles in such products, being coarse, tend to settle rapidly and to reagglomerate. Agitation, even after cooling, can cause the particles to coalesce or "seize." In addition to its lack of stability, "sodium sand" is difficult to measure into aliquot parts because of its rapid settling.

A major advance in the preparation of sodium dispersions was made by Hansley, U. S. Patent 2,394,608, with the incorporation into the sodium-liquid systems of small amounts of sodium soaps as stabilizing agents. Dispersions prepared by the method of the patent contain sodium particles averaging around 50 to 200 microns, generally about 100 microns, in size. Such dispersions settle slowly, if at all, and show practically no tendency to "seize" or coalesce.

Stable dispersions in which the alkali metal particles are still more finely divided may be prepared by the methods of Hansley Patents 2,487,333 and 2,487,334 in which adsorption binaries of finely divided active carbon and alkali metal soaps of the higher fatty acids, or alkali metal salts of certain hydroperoxides, e. g., tetralin hydroperoxide and tert. butyl hydroperoxide, are employed as emulsifying agents. Similar finely divided dispersions may be prepared by the method of Hansley and Hilts, application S. N. 81,874, filed March 17, 1949 now Patent 2,579,257, in which addition compounds formed from the alkali metal cleavage products of certain ethers are used as emulsifying agents.

The present invention relates to the production of similar finely divided metal dispersions involving the use of a new class of dispersing agents. It is, accordingly, one object of the invention to provide new and improved dispersion of alkali metals in inert organic liquids, particularly hydrocarbons, and to provide a convenient and practical method for making such dispersions. Other objects will be apparent from the following description of the invention.

The above objects are accomplished in accordance with the invention by preparing an emulsion of finely divided molten particles of an alkali metal in an inert organic liquid in the presence of an emulsifying agent of the type hereinafter defined. Such dispersions may be prepared by heating together the metal and the inert liquid to a temperature between the melting point of the metal and the boiling point of the liquid in the presence of the emulsifying agent while effectively agitating the mixture and then cooling the resulting emulsion to a temperature below the freezing point of the metal. The emulsifying agent may be present during the entire operation or may be added during the latter part of the period of agitation. Agitation may be accomplished by any desired method which will effect the proper degree of subdivision.

Dispersions prepared as indicated contain the metal in a finely divided, active form which is stable against settling and reagglomeration. The degree of stability and the fineness of the particle size will depend somewhat upon the identity of the emulsifying agent employed, as will also the redispersibility of the metal particles in instances where some settling occurs. However, in all instances, use of the present emulsifying agents has been found to improve substantially one or more, or all, of the following: (a) fineness of the dispersed particles; (b) stability of the dispersion against settling and reagglomeration; and (c) redispersibility of particles which have settled substantially. The present dispersions are distinctly superior to the "sodium sands" of the prior art and are useful for many purposes. Thus, they can be used advantageously as the source of metal in carrying out chemical reactions, e. g., metallation and reduction reactions, and in petroleum refining processes.

A convenient form of apparatus for preparing the dispersions comprises an emulsifying vessel and a circulatory system by means of which a stream of a mixture of the molten metal and the inert liquid may be forced at high velocity through an orifice of suitable size. Preferably the stream from the orifice is directed at an abrupt angle, e. g., 90°, against a splash plate about ¼ in. away and immersed in the mixture, means being provided for adding the emulsifying agent to the system when required. Delivery of the mixture against the splash plate from a nozzle about $\frac{1}{16}$ to $\frac{1}{32}$ in. in diameter at a linear velocity of about 246 ft./sec. gives generally satisfactory results when operating on the scale indicated in the examples. Linear velocities should generally be at least about 100 ft./sec., 100 to 1,000 ft./sec. being generally satisfactory. The orifice size and the distance from the orifice to the splash plate may be varied considerably depending upon the scale of operation.

Apparatus of the above type is described in more detail and is illustrated diagrammatically in Hansley Patents 2,487,333 and 2,487,334.

The term "alkali metals" is used herein to include lithium, sodium, potassium, rubidium and caesium and also alloys of two or more such metals with each other, for example, potassium-sodium alloys.

The terms "emulsion" and "emulsifying agent" are used herein with reference to the systems when they are at temperatures above the melting point of the metal, i. e., under conditions where the metal is liquid. The terms "dispersion" and "dispersing agent" are employed with reference to the same systems when they are at a temperature below the melting point of the metal.

The compounds which are suitable for use as emulsifying agents in accordance with the invention are those of the formula R—O—X in which the total number of carbon atoms plus oxygen atoms is in the range 5 to 31, X is hydrogen or alkali metal and R contains no element other than hydrogen, carbon and oxygen and is a substituted (as indicated below) or unsubstituted, saturated or unsaturated, acyclic or alicyclic, aliphatic radical; or a substituted (as indicated below) or unsubstituted aromatic radical of the benzene or naphthalene series. When R is a substituted aliphatic radical, the substituent groups should number from 1 to 3 and each should be an alkoxy group having 1 to 3 carbons. When R is a substituted aromatic radical, the substituent group, or groups, should be either a single alkoxy radical of 1 to 3 carbons or 1 or 2 alkyl groups of from 1 to 18 carbons each. As will be apparent from the above, the R radical may or may not contain oxygen, but whether or not oxygen is present, the sum of the carbon atoms and oxygen atoms, if present, in R should be at least 4 and not more than 30.

Specific compounds which are effective as emulsifying agents are the following hydroxy compounds and their alkali metal alkoxides: n-butanol, sec.-butanol, tert.-butanol, n-hexyl alcohol, n-octyl alcohol, n-dodecyl alcohol, cetyl alcohol, and n-docosanol; 2-ethyl hexyl alcohol, cyclohanol, 2,4-dihexyldodecanol-1 and heptadecyldimethylcarbinol; linalool, citronellol and the mixed, highly unsaturated alcohols, derived from Menhaden oil; phenol, o-cresol, 2-hydroxy-1,3-dimethyl benzene, octadecyl phenol and beta-naphthol; ethylene glycol, tetramethylene glycol, 2-ethylhexanediol-1,3, and 2-methylpentanediol-2,4; and ethylene glycol monoethyl ether, beta,-beta-dimethoxy ethanol, diethylene glycol monoethyl ether, glyceryl-alpha,alpha'-diisopropyl ether and glyceryl-alpha-isopropyl ether.

The preferred compounds of the R—O—X type as defined above are those in which the sum of the carbon and oxygen atoms, if present, in R is within the range 4 to 28. Especially preferred are the monohydric alcohols containing from 12 to 28 carbon atoms such as dodecyl, hexadecyl and octadecyl alcohols, the corresponding unsaturated alcohols and also Menhaden oil alcohol.

In evaluating the effectiveness of various hydroxy compounds, or their alkoxides, as emulsifying agents, a series of experiments were carried out in which all factors except the agent employed were kept constant. Apparatus similar to that described in Hansley Patents 2,487,333 and 2,487,334 was employed. 500 cc. of Nujol, a heavy mineral oil of U. S. P. grade, was added to the emulsifying vessel and heated to 110–120° C. 285 g. of metallic sodium cut into pieces approximately cubical and from ¾ to 1 in. in any one direction, and 3 cc. of the emulsifying agent if liquid or 3 g. if solid were subsequently added. This amount of sodium was sufficient to give dispersions having a sodium content of approximately 40% by weight. This amount of emulsifying agent was roughly 1% based on the weight of sodium. The agent and sodium were added to the apparatus as follows: With the pump running at 200–400 R. P. M. there was added, successively, one third of the emulsifying agent, one-half of the sodium over a 10–15 minute period, the second third of the agent, the second half of the sodium over a 10–15 minute period, and then the final third of the agent, keeping the temperature in the vessel at 110–120° C. at all times. The vessel was then covered and the pump run at 800 to 900 R. P. M. for 1 hour. The mixture was then sucked out of the vessel and allowed to cool in storage containers. In general, the dispersions were gray to lavender in color, fluid, and made up of sodium particles less than 100 microns in diameter down to as small as 1 micron in diameter. A typical experiment illustrative of this general procedure is described in the following example.

*Example 1*

500 cc. of Nujol, a heavy mineral oil of U. S. P. grade, was put into the emulsifying vessel and heated to 110–120° C. Then with the pump running at low speed (200–400 R. P. M.) there was added to the oil in the following order: 1 cc. of n-octyl alcohol, approximately 140 g. of sodium cut into one inch cubes over 10–15 minutes, 1 cc. of n-octyl alcohol, 145 g. of sodium over 10–15 minutes, and a final 1 cc. of n-octyl alcohol. The cover was then placed on the vessel and the pump run at high speed (800–900 R. P. M.) for 1 hour, at the end of which time the dispersion was sucked out of the vessel. The dispersion was light gray in color with a lavender cast, and only slightly more viscous than the oil would be without the sodium. At the end of two weeks standing the dispersion had settled to 78% of the total volume. Redispersing the sodium was easy and complete. Microscopic observation indicated that the particles were mostly in the 10 to 25 micron size range, with some as small as 2 microns and others as large as 30 microns.

Results of similar experiments with other straight chain, saturated, primary alcohols are summarized in Table I. Minor variations in procedure were necessary in some cases, as certain of the alcohols were too volatile or too reactive with sodium to permit their safe addition at 110–120° C. In these cases the alcohol diluted with oil was allowed to react with sodium at room temperature, and the alcoholate introduced as such into the dispersing vessel.

TABLE I

Dispersions using straight chain saturated primary alcohols

[40% sodium by weight in Nujol; 1% dispersing agent based on weight of sodium.]

| Example | Agent | Particle Size, Microns | | | Dispersion Height, Percent after 2 weeks | Redispersibility After 2 Weeks |
|---|---|---|---|---|---|---|
| | | Min. | Most Frequent | Max. | | |
| 2 | methanol | | 30-100 | 100 | 63 | Complete—poor. |
| 3 | ethanol (absolute) | 15 | 50 | 125 | 65 | Complete—difficult. |
| 4 | n-butanol | 5 | 10- 25 | 45 | 66 | Complete—good. |
| 5 | n-hexyl alcohol | 5 | 10- 20 | 35 | 77 | Complete—excellent. |
| 1 | n-octyl alcohol | 2 | 10- 25 | 30 | 78 | Complete—good. |
| 6 | n-dodecyl alcohol | 2 | 10- 20 | 30 | 81 | Complete—excellent. |
| 7 | cetyl alcohol | 1-2 | 5- 15 | 25 | 91 | Do. |
| 8 | n-docosanol | 5 | 10- 25 | 35 | 94 | Do. |
| 9 | $C_{24}$ alcohol—unknown config. | 1-2 | 7- 12 | 15 | 87 | Incomplete—poor. |
| 10 | None (Control) | 15 | 35-100 | 125 | 65 | Do. |

The attached drawing is a plot of one of the criteria of dispersing agent effectiveness, i. e., particle size (minimum and most frequent range), against the number of carbon atoms in the chain. In the drawing the cross-hatched area represents the ranges of most frequently occurring particle sizes. This graph shows that the effectiveness of straight chain saturated primary alcohols, or their alcoholates, as dispersing agents increases with increasing length of the carbon chain and that alcohols with less than 4 carbon atoms, while better than no dispersing agents, are not nearly as useful as those with longer carbon chains.

Table II summarizes the results of seven experiments in which the concentrations of sodium and/or dispersing agents were varied, and other inert oils such as xylene and diesel fuel oil were used as well as heavy mineral oil (Nujol) as dispersing media. These experiments show that concentrations can be varied over wide ranges and that heavy mineral oil, xylene and straight-run diesel fuel are all satisfactory dispersing media. In the table, the percentages of sodium are based on the total weight of the mixture whereas the percentages of the agents are based on the weight of sodium.

TABLE II

Dispersions showing effects of changing concentrations and media

| Example | System and Agent | Particle Size, Microns | | | Dispersion Height, percent after 2 weeks | Redispersibility After 2 wks. |
|---|---|---|---|---|---|---|
| | | Min. | Most Frequent | Max. | | |
| 11 | 40% Sodium in Nujol-0.2% cetyl alcohol. | 5 | 10-20 | 30 | 77 | Complete—excellent. |
| 12 | 40% Sodium in Nujol-5% cetyl alcohol. | 2-3 | 10-25 | 100 | 100 | Complete—excellent—very thick—thixotropic. |
| 13 | 20% Sodium in Nujol-1% octyl alcohol. | 3 | 7-15 | 20-25 | 44 | Complete—excellent. |
| 14 | 50% Sodium in Nujol-2% octyl alcohol. | (¹) | (¹) | (¹) | (¹) | (¹). |
| 15 | 40% Sodium in xylene-1% dodecyl alcohol. | 3-5 | 7-20 | 25 | 75 | Complete—excellent—thin. |
| 16 | 40% Sodium in diesel fuel—no dispersing agent. | 2-3 | 5-20 | 25 | 75 | Complete—fair. |
| 17 | 40% Sodium in diesel fuel—1% dodecyl alcohol. | 2-3 | 5-15 | 20 | 91 | Complete—excellent—very thin. |

¹ Too thick to pump.

The effects of varying the type of alcohol, e. g., primary, secondary or tertiary, and of chain branching are shown by the results listed in Table III. Judged by the particle size produced, the 4-carbon atom alcohol series shows that tertiary alcohols are better dispersing agents than secondary alcohols which are better than primary alcohols; this also is shown by the 6-carbon alcohols as regards primary and secondary alcohols. The higher molecular weight alcohols do not exhibit these differences to the same degree. Chain branching also apparently helps to increase dispersing action although this may be due in part to the increase in molecular weight.

TABLE III

Dispersions using different types of saturated alcohols

[40% sodium by weight in Nujol; 1% dispersing agent based on weight of sodium.]

| Example | Agent | Particle Size, Microns | | | Dispersion Height, percent after 2 weeks | Redispersibility after 2 weeks |
|---|---|---|---|---|---|---|
| | | Min. | Most Frequent | Max. | | |
| 4 | n-Butanol | 5 | 10–25 | 45 | 66 | Complete—good. |
| 18 | Sec.-butanol | 3 | 15–20 | 35–40 | 74 | Complete—excellent. |
| 19 | t-butanol | 1–2 | 10–20 | 30 | 69 | Do. |
| 5 | n-hexyl alc | 5 | 10–20 | 35 | 77 | Do. |
| 20 | 2-ethylhexyl alc | 3–5 | 5–20 | 25 | 74 | Do. |
| 21 | Cyclohexanol | 1–2 | 10–20 | 30 | 74 | Do. |
| 6 | n-dodecyl alc | 2 | 10–20 | 30 | 81 | Do. |
| 22 | 2,4-dihexyldodecanol-1 | 1–2 | 5–15 | 20 | 84 | Incomplete—good for redispersible part. |
| 7 | Cetyl alc | 1–2 | 5–15 | 25 | 91 | Complete—excellent. |
| 23 | 2-Methyltetradecanol-3 | | | | 94 | Not redispersible. |
| 24 | Diheptadecyl carbinol | 10 | 50–100 | 125 | 71 | Incomplete—difficult. |
| 25 | Heptadecyldimethyl carbinol | 2–3 | 5–15 | 25 | 100 | Incomplete—excellent for redispersible part. |

That unsaturation in the carbon chain helps to make a better dispersing agent of an alcohol is shown by the results summarized in Table IV. Decreased particle size and decreased settling indicate the improved action given by the introduction of one or more double bonds into the molecule.

densed ring systems are as good dispersing agents as aliphatic hydroxy compounds. Short side chains on the benzene ring seem to have little or no effect on the dispersing agent, but long ones are deleterious. Mixed compounds, those in which the hydroxy group is on the side chain instead of the ring, are not effective. Polyphenols

TABLE IV

Dispersions using unsaturated alcohols

[40% sodium by weight in Nujol; 1% dispersing agent based on weight of sodium.]

| Example | Agent | Particle Size, Microns | | | Dispersion Height, percent after 2 weeks | Redispersibility after 2 weeks |
|---|---|---|---|---|---|---|
| | | Min. | Most frequent | Max. | | |
| 6 | Dodecyl alcohol | 2 | 10–20 | 30 | 81 | Complete—excellent. |
| 26 | Linalool $(CH_3)_2C:CHCH_2CH_2C(CH_3)(OH)CH:CH_2$ | 2–3 | 5–12 | 15 | 94 | Incomplete—good for redispersible part. |
| 27 | Citronellol $(CH_3)_2C:CHCH_2CH_2CH(CH_3)CH_2CH_2OH$ | 2–3 | 5–10 | 20 | 90 | Complete—excellent—some gross shiny particles. |
| 28 | Mixed alcohols from Menhaden oil—highly unsaturated. | 2 | 5–20 | 25 | 94 | Complete—excellent. |

Table V summarizes the results of experiments designed to show the effects of the introduction such as resorcinol are not effective dispersing agents for this system.

TABLE V

Dispersions using aromatic hydroxy compounds

[40% sodium by weight in Nujol; 1% dispersing agent based on weight of sodium.]

| Example | Agent | Particle Size, Microns | | | Dispersion Height, percent after 2 weeks | Redispersibility after 2 weeks |
|---|---|---|---|---|---|---|
| | | Min. | Most Frequent | Max. | | |
| 5 | n-Hexyl alcohol | 5 | 10–20 | 35 | 77 | Complete—excellent. |
| 21 | Cyclohexanol | 1–2 | 10–20 | 30 | 74 | Do. |
| 29 | Phenol | 2–3 | 5–12 | 15 | 74 | Do. |
| 30 | Octadecylphenol | 5 | 10–20 | 30 | 85 | Incomplete—poor. |
| 31 | O-Cresol | 3 | 5–15 | 20 | 82 | Complete—excellent. |
| 32 | 2-Hydroxy-1,3-dimethyl benzene. | 3 | 8–15 | 25 | 83 | Complete—good. |
| 33 | Resorcinol | (1) | (1) | (1) | (1) | (1). |
| 34 | beta-Naphthol | 1–2 | 5–8 | 12–15 | 25 | Complete—excellent—some gross shiny particles. |
| 35 | Benzyl alcohol | 1–2 | 10–20 | 30 | 84 | Incomplete—poor. |

1 Did not dissolve—stopped pump.

of the aromatic nucleus into the hydroxy compound, with other $C_6$ alcohols shown for comparison. The results indicate that aromatic hydroxy compounds with either simple or con- The effectiveness of di- and polyhydroxy aliphatic compounds as dispersing agents for the sodium-in-oil system is indicated by the experimental results summarized in Table VI. Inspection of the table shows that: (1) glycols and diols with 6 or less carbon atoms in the longest chain are effective dispersing agents, (2) glycols and diols with 10 or more carbon atoms in the chain are of little or no value as dispersing agents for this system, and (3) that even the low molecular weight compounds with three or more hydroxy groups are only fair at the best as dispersing agents.

TABLE VI

*Dispersions using polyhydric alcohols*

[40% sodium by weight in Nujol; 1% dispersing agent based on weight of sodium.]

| Example | Agent | Particle Size, Microns | | | Dispersion Height, percent after 2 weeks | Redispersibility after 2 weeks |
|---|---|---|---|---|---|---|
| | | Min. | Most Frequent | Max. | | |
| 36 | Ethylene Glycol | 10 | 20–45 | 60 | 75 | Complete—excellent. |
| 37 | Tetramethylene glycol | 5 | 10–25 | 35 | 74 | Do. |
| 38 | Decamethylene glycol | (1) | (1) | (1) | (1) | (1) |
| 39 | 2-Ethylhexanediol-1,3 | 2 | 5–8 | 12 | 87 | Complete—excellent. |
| 40 | Octadecanediol-1,12 | (2) | (2) | (2) | (2) | (2) |
| 41 | 2-Methylpentanediol-1,2 | 2–3 | 5–15 | 25 | 80 | Complete—good to excellent. |
| 42 | Glycerol | 5 | 25 | 50 | 67 | Complete—fair to poor. |
| 43 | Methyltrimethylolmethane | 3 | 10–20 | 30 | 78 | Complete—fair. |
| 44 | Pentaerythritol | (3) | (3) | (3) | (3) | (3) |

¹ Only partly dispersed.
² Did not disperse.
³ Too insoluble. Pump stalled.

Ether alcohols are compared with alcohols having essentially the same molecular weights, configurations and the same numbers of hydroxy groups in Table VII. In general, it appears that alkoxy groups have the same effect on a dispersing agent as would a carbon group of the same size. Minor differences may be attributed to the effects of chain branching. Thus, if a carbon-hydroxy compound is a good dispersing agent an ether-alcohol of approximately the same molecular weight and configuration, and containing similar hydroxy groups, can be expected to behave similarly as a dispersing agent. The series of commercial polyethylene oxide-higher alcohol condensation products typified by the formula $C_nH_{2n+1}(OCH_2CH_2)_xOH$, where $n$ and $x$ each is 2 to 24 and in the same range, are also effective dispersing agents for the sodium-in-oil system.

employed in conjunction with other dispersing agents such as those described in the copending application and patents mentioned above, or in conjunction with stabilizing agents such as the higher fatty acids and their alkali metal soaps described in Patent 2,394,608. Such soaps or acids, when used in small amounts, e. g., 0.005 to 0.1% of the total mixture, exert a remarkable thinning action on dispersions of the present type, which is advantageous particularly in instances where the dispersion tends to become thick and difficult to pour or agitate. Additions of larger amounts of soaps, e. g., 0.1 to 5% usually result in gel formation and frequently in the obtainment of thixotropic compositions.

Any device for agitating or emulsifying can be used in place of the vessel, pump and jet combination described in the Hansley patents. Equivalents in this sense are extremely well agitated vessels, especially those so designed that a large amount of shear and turbulence are created, colloid mills of various types, pumps, and centrifugal attenuators.

In addition to the three types of oils shown in the examples as dispersing media, any liquid with which sodium does not react, and which has a boiling point above the melting point of sodium should be suitable. Examples of such liquids are

TABLE VII

*Dispersions using ether alcohols*

[40% sodium by weight in Nujol; 1% dispersing agent based on weight of sodium.]

| Example | Agent | Particle Size, Microns | | | Dispersion Height, Percent after 2 weeks | Redispersibility after 2 weeks |
|---|---|---|---|---|---|---|
| | | Min. | Most Frequent | Max. | | |
| 5 | n-Hexyl alcohol | 5 | 10–20 | 35 | 77 | Complete—excellent. |
| 45 | Ethylene glycol monoethyl ether. | 5 | 10–15 | 20 | 81 | Complete—good. |
| 46 | beta, betadimethoxy ethanol | 2 | 10–15 | 20 | 87 | Complete—excellent. |
| 1 | n-Octyl alcohol | 2 | 10–25 | 30 | 78 | Complete—good. |
| 47 | Diethylene glycol monoethyl ether. | 3 | 10–15 | 25 | 84 | Do. |
| 6 | Dodecyl alcohol | 2 | 10–20 | 30 | 81 | Complete—excellent. |
| 48 | Glyceryl-alpha, alpha'-diisopropyl ether. | 1–2 | 5–10 | 20 | 97 | Do. |
| 39 | 2-Ethylhexanediol-1,3 | 2 | 5– 8 | 12 | 87 | Do. |
| 49 | Glyceryl-alphaisopropyl ether. | 2–3 | 10–15 | 25 | 84 | Complete—good. |

The above examples illustrate the preparation of sodium dispersions but the invention is not so restricted since other alkali metals, including alloys of two or more such metals, may be used in place of sodium to obtain useful finely divided stable dispersions.

If desired, the present dispersing agents may be various petroleum fractions suitably refined, high boiling ethers which are inert towards the alkali metal under the conditions of use, naphthalene, tetralin, and other hydrocarbons. Inert liquids whose atmospheric boiling points are below the melting point of the metal may be utilized if pressures are used which raise the boiling points of such liquids to above the melting point of the metal.

Although in the examples cited the temperature during emulsification was held in the 110–120° C. range, this narrow range is by no means the only operable one. Temperatures lower than 110° C. but above the melting point of the metal are operable, but require longer times due to the decreased temperature difference available for transferring heat to the metal to melt it; if melted sodium is introduced into the oil this temperature range becomes quite feasible. Temperatures above 120° C. are operable if decomposition of either the dispersing medium or the emulsifying agent is not encountered; with diesel fuel, for example, dispersions have been made in the 150° C. temperature range.

The order of addition of the components of the dispersion to the emulsifying system is not critical and any order may be employed, it being only important that the emulsifying agent be present in the system during at least part of the time during which the mixture of the dispersing liquid and molten metal is undergoing vigorous agitation. However, the order of addition illustrated in Example 1 is preferred since it has been found that if the quantity of undispersed metal in the system is kept small or at a minimum at all times finer dispersions in shorter times result. Also, it is generally advantageous to have some emulsifying agent in the system from the start so as to minimize reagglomeration of the metal.

The amount of emulsifying agent employed may be varied considerably but for practical purposes will generally be within the range of 0.05 to 5% based on the weight of the metal being dispersed. The preferred range is 0.2 to about 2%. Amounts substantially greater than 5% may be used if desired.

The dispersions may be prepared so as to contain any desired amount of dispersed metal which is practical in their preparation and use. For most uses, metal concentrations of 20 to 65% by weight will be most practical and are preferred. Concentrations above about 65% yield compositions which are generally not sufficiently fluid for handling purposes. Dispersions containing less than about 20% metal may be valuable and desirable for certain purposes. They may be prepared as illustrated in the present examples or by diluting more concentrated dispersions with an inert liquid. Diluents boiling either above or below the melting point of the metal may be used for this purpose.

The accepted index for the ignition quality of diesel fuels is the cetane number. The higher such number, the more readily the fuel ignites on compression. With the increasing use of diesel engines for the generation of power, there is a great demand for hydrocarbon fuels with ignition characteristics that will permit their use in a compression-ignition (i. e., diesel) cycle without excessive time lag in ignition. Modern high speed diesel engines will not operate smoothly with a slow-igniting fuel. Excessive ignition lag leads to incomplete and inefficient combustion, rough running and heavy smoke formation. There is a recognized need for effective and economical ignition accelerators that will permit the use of diesel fuels of petroleum distillates, such as the gas oil fractions, not now satisfactory for this use because of their inferior ignition quality.

Alkali metals are effective ignition accelerators for diesel fuels, particularly when the metal is present in finely divided condition. But small amounts, e. g., on the order of 0.1, are required to produce a relatively large increase in the cetane number of such fuels when added to fuels of inferior ignition characteristics. Because dispersions prepared as illustrated in the above examples contain the metal in finely divided form they are useful as diesel fuel additives for the purpose of improving the ignition characteristics as indicated. Additions in amounts to give a metal concentration in the fuel as low as 0.001% are beneficial but concentrations of 0.01 to 0.2% are preferred. Metal concentrations exceeding about 0.5% are not recommended since greater amounts do not further improve the cetane number.

Use of the present dispersions as diesel fuel additives for increasing the cetane number of the fuel is illustrated by the following examples.

*Example 50*

480 g. of sodium was dispersed in 640 g. of cetane containing 10 g. of cetyl alcohol using the general procedure and equipment described previously. Addition of 1.4 cc. of the resulting dispersion to a hydrocarbon diesel fuel (giving 0.1% active sodium based on the fuel mixture) raised the cetane number of the fuel from 47 to 53.

*Example 51*

285 g. of sodium was dispersed in 500 cc. of Nujol containing 3 g. of heptadecyldimethylcarbinol as the dispersing agent and 90 g. of an ethylene polymer of molecular weight of about 12,500. One gram of the resulting dispersion was added to a mixture of 250 cc. each of cetane and isooctane. The cetane number of this fuel was increased by this addition from 55 to 60.

I claim:

1. A composition consisting essentially of a dispersion of finely divided alkali metal particles of a size not exceeding about 125 microns in diameter in an organic liquid inert to said metal and having a boiling point above the melting point of said metal and containing 0.001 to 65% by weight of dispersed alkali metal and at least 0.05% but not more than about 5% by weight, based on the alkali metal content of said composition, of a compound of the formula R—O—X in which the sum of the carbon atoms plus oxygen atoms is 5 to 31, X is from the group consisting of hydrogen and alkali metal and R contains no element other than hydrogen, carbon and oxygen and is selected from the group consisting of: (a) unsubstituted, saturated and unsaturated, acyclic and alicyclic, aliphatic radicals; (b) substituted, saturated and unsaturated acyclic and alicyclic, aliphatic radicals in which each substituent is an alkoxy group having 1 to 3 carbons and the total number of such substituents is 1 to 3; (c) unsubstituted aromatic radicals of the benzene and naphthalene series; (d) aromatic radicals of the benzene and naphthalene series having but one substituent group which is an alkoxy group of 1 to 3 carbons; and (e) aromatic radicals of the benzene and naphthalene series having 1 to 2 substituent groups each of which is an alkyl group of 1 to 18 carbons.

2. A composition according to claim 1 containing 20 to 65% by weight of dispersed metal.

3. A composition according to claim 1 wherein the dispersed metal is sodium.

4. A composition according to claim 1 wherein the R of the R—O—X compound contains 4 to 28 carbon atoms.

5. A composition according to claim 1 wherein R of the R—O—X compound is the hydrocarbon residue of a monohydric alcohol containing 12 to 28 carbon atoms.

6. A composition according to claim 1 wherein the R of the R—O—X compound is an unsaturated hydrocarbon residue.

7. A process for the production of a dispersion of an alkali metal in an organic liquid inert to said metal and having a boiling point above the melting point of said metal, said composition to contain dispersed alkali metal particles of a size not exceeding about 125 microns in diameter in an amount equal to 0.001 to 65% of the total weight of said composition; comprising agitating a mixture of said metal, said liquid and at least 0.05% but not exceeding about 5%, based on the weight of said metal, of a compound of the formula R—O—X as defined in claim 1, at a temperature between the melting point of said metal and the boiling point of said liquid.

8. A process according to claim 7 wherein the concentration of metal in the mixture is 20 to 65% by weight.

9. A process according to claim 7 wherein the metal is sodium.

10. A process according to claim 7 wherein the R in the R—O—X compound contains 4 to 28 carbon atoms.

11. A process according to claim 7 wherein the R of the R—O—X compound is the hydrocarbon residue of a monohydric alcohol containing 12 to 28 carbon atoms.

12. A process according to claim 7 wherein the R—O—X compound used is one in which the R is an unsaturated hydrocarbon residue.

13. A fuel for compression-ignition engines of the diesel type consisting essentially of a hydrocarbon fuel and containing 0.001 to 0.5% by weight of finely divided alkali metal having a particle size not exceeding about 125 microns in diameter dispersed therein and 0.05 to 5% by weight, based on the weight of said metal, of a compound of the formula R—O—X as defined in claim 1.

14. A fuel according to claim 13 in which the average particle size of the dispersed metal particles is not greater than about 25 microns in diameter.

HERBERT K. LIVINGSTON.

References Cited in the file of this patent

UNITED STATES PATENTS

| Number | Name | Date |
|---|---|---|
| 2,394,608 | Hansley | Feb. 12, 1946 |
| 2,479,693 | Morey et al. | Aug. 23, 1949 |
| 2,579,257 | Hansley et al. | Dec. 18, 1951 |